United States Patent Office 3,436,366
Patented Apr. 1, 1969

3,436,366
SILICONE POTTING COMPOSITIONS COMPRISING MIXTURES OF ORGANOPOLYSILOXANES CONTAINING VINYL GROUPS
Frank J. Modic, Scotia, N.Y., assignor to General Electric Company, a corporation of New York
No Drawing. Filed Dec. 17, 1965, Ser. No. 514,650
Int. Cl. C08g 47/06
U.S. Cl. 260—37                    2 Claims

ABSTRACT OF THE DISCLOSURE

Silicone potting compositions useful in the formation of molds comprise a diorganovinyl chain-stopped diorganopolysiloxane having a viscosity of from about 50,000 to 750,000 centistokes, an organopolysiloxane copolymer of trimethylsiloxane units, methylvinylsiloxane units, and $SiO_2$ units, a liquid organohydrogenpolysiloxane, and a platinum catalyst. These materials are characterized by unusually high tear strengths.

---

This invention relates to silicone elastomer compositions which are pourable and which are curable at moderate temperatures to produce a strong silicone rubber.

In the past, pourable silicone compositions have been known which cure to elastomers at room temperature or moderately elevated temperatures. However, any compositions heretofore known meeting these criteria have been generally lacking in the strength which is required for many applications. Thus, any of these compositions which have been both pourable and curable at room temperature have been so weak so that it has been possible to chip or nick the materials with very little force. This has tended to limit the applications of these materials to situations in which a tough, high precision cured silicone rubber was needed, such as in the making of molds for the manufacture of various parts.

The present invention is based on my discovery of new compositions which are pourable, which are curable at room temperature and moderate temperatures, and which cure to an unexpectedly tough silicone elastomer having tear strength greater than about 60 pounds per inch. These compositions comprise, by weight, (1) 100 parts of a liquid vinyl chain-stopped polysiloxane having the formula:

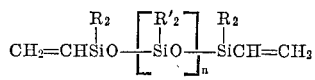

where R and R′ are monovalent hydrocarbon radicals free of aliphatic unsaturation, with at least 50 mole percent of the R′ groups being methyl and where $n$ has a value sufficient to provide a viscosity of from about 50,000 to 750,000 centistokes at 25° C., preferably from about 50,000 to 150,000, inclusive,
(2) from 20 to 50 parts of an organopolysiloxane copolymer comprising $(R'')_3SiO_{0.5}$ units and $SiO_2$ units, where R″ is a member selected from the class consisting of vinyl radicals and monovalent hydrocarbon radicals free of aliphatic unsaturation, where the ratio of $(R'')_3SiO_{0.5}$ units to $SiO_2$ units is from about 0.5:1 to 1:1, and where from about 2.5 to 10 mole percent of the silicon atoms contain silicon-bonded vinyl groups,
(3) from 0 to 200 parts of a finely divided inorganic filler which is non-reinforcing for silicone elastomers,
(4) a platinum catalyst, (5) an amount of a liquid organohydrogen polysiloxane having the formula:

$$(R)_a(H)_bSiO_{\frac{4-a-b}{2}}$$

sufficient to provide from about 0.5 to 1.0 silicon-bonded hydrogen atom per silicon-bonded vinyl group in the composition, where R is as previously defined, $a$ has a value of from 1.00 to 2.10, $b$ has a value of from about 0.1 to 1.0, and the sum of $a$ plus $b$ is from about 2.00 to 2.67, there being at least two silicon-bonded hydrogen atoms per molecule.

The compositions of the present invention are prepared by mixing in a suitable fashion all of the components described above, plus any additional components such as will be described subsequently, and maintaining the mixture at the temperature at which it is to be cured. The compositions cure at temperatures which vary from room temperature to temperatures of the order of 100° C. or higher, depending upon the particular amount of platinum catalyst present in the composition and depending upon the time which is allowed for the cure. Likewise, the compositions can be prevented from curing by maintaining them at a reduced temperature, such as a temperature of 0° C., in which case all of the components can be kept together for extended periods of time without curing. The compositions can vary from readily flowable liquids to slowly flowing liquids, depending upon the viscosity of the various components employed in the reaction mixture depending upon the amount of filler included in the reaction mixture. Regardless of the flow characteristics of the compositions of the present invention and the proportions of the various ingredients, the compositions cure to a hard, tough silicone elastomer upon maintaining the compositions at the curing temperature for the required amount of time. The compositions which are free of filler are transparent and the compositions containing fillers are translucent or opaque, depending upon the particular filler employed, and the color of the cured product is a function of the filler and any coloring agents added to the compositions.

All of the components of the composition of the present invention are well known in the art. The vinyl chain-stopped organopolysiloxane component (1) is typified by various compositions within the scope of formula (1) where the monovalent hydrocarbon radicals represented by R and R′ include alkyl radicals, e.g., methyl, ethyl, propyl, butyl, octyl, etc. radicals; aryl radicals, e.g., phenyl, tolyl, xylyl, etc. radicals; cycloalkyl radicals, e.g., cyclohexyl, cycloheptyl, etc. radicals; aralkyl radicals, e.g., benzyl, phenylethyl, etc. radicals. In the preferred embodiment of the invention, all of the radicals represented by R and R′ are selected from the class consisting of methyl and phenyl radicals and, in the preferred specific composition, all of the radicals represented by R and R′ are methyl.

The organopolysiloxane copolymer which comprises component (2) of the compositions of this invention have been defined as including R″ groups which can be vinyl or monovalent hydrocarbon radicals free of aliphatic unsaturation, with at least the stated proportion of the R″ groups being vinyl. The R″ groups which are not vinyl are of the same scope as the R and R′ groups of formula (1) and like these groups, in the preferred embodiment of the invention, all of the monovalent hydrocarbon radicals free of aliphatic unsaturation are preferably methyl groups. The vinyl groups can be present either as a portion of the $(R'')_3SiO_{0.5}$ groups or of the $(R'')_2SiO$ groups or can be present in both groups.

In general, the various types of siloxane units in copolymer component (2) are selected so that the ratio of the $(R'')_3SiO_{0.5}$ units to the $SiO_2$ units is between 0.5:1 and 1:1. The $(R'')_2SiO$ units are preferably present in an amount equal to from about 1 to 10 mole percent based on the total number of moles of siloxane units in the copolymer. Regardless of where the silicon-bonded vinyl groups are located in the copolymer, the silicon-bonded vinyl groups should be present in an amount equal to from about 2.5 to 10.0 mole percent of copolymer component (2).

The copolymer component (2) is a solid, resinous material and is most often available as a solution in a solvent such as xylene or toluene, generally as a 40 to 60 percent by weight solution. For ease of handling the compositions of the present invention, this solution of copolymer component (2) is usually dissolved in some or all of vinyl chain-stopped polysiloxane component (1) and the solvent stripped from the resulting solution to produce a solution of copolymer component (2) in component (1). The proportion of the solution of component (2) is selected so as to give the desired amount of component (2) when the solution is combined with the other components of the composition of this invention.

The finely divided filler component (3) is an optional component and when omitted, the compositions of the present invention cure to transparent silicone rubber. The function of the finely divided filler is not to reinforce the silicone elastomer and, therefore, reinforcing silicone fillers are generally not employed. The main function of the finely divided filler is to act as an extender for the compositions and thus reduce their cost. The effect of the filler in the compositions is generally to increase the hardness of the cured product. The finely divided inorganic fillers which comprise component (4) can include almost any type of finely divided inorganic material, such as ground quartz, titanium dioxide, calcium silicate, ferric oxide, chromic oxide, cadmium sulfide, glass fibers, calcium carbonate, carbon black, lithopone, talc, etc.

The platinum catalyst component (4) employed in the present invention includes all of the well known platinum catalysts which are effective for catalyzing the reaction between silicon-bonded hydrogen groups and silicon-bonded vinyl groups. These materials include the various finely divided elemental platinum catalysts, such as those shown in Patent 2,970,150—Bailey, the chloroplatinic acid catalyst described in Patent 2,823,218—Speier, the platinum hydrocarbon complexes shown in Patents 3,159,601—Ashby, and 3,159,662—Ashby, as well as the platinum alcoholate catalysts which are described in Patent 3,220,972—Lamoreaux. Regardless of the type of platinum catalyst employed, the catalyst is used in an amount sufficient to provide from about $10^{-3}$ to $10^{-6}$ gram atoms of platinum per mole of silicon-bonded vinyl groups in the composition.

The organohydrogenpolysiloxane component (5) is generally a composition of relatively simple molecular structure and is sometimes a mixture of such materials. One characteristic of the organohydrogenpolysiloxane is that it has two silicon-bonded hydrogen atoms per molecule. One of the silicon-bonded hydrogen atoms of the molecule reacts with a silicon-bonded vinyl group of one of the components which comprise component (1) or component (2) and the second silicon-bonded hydrogen atom reacts with another of such silicon-bonded vinyl groups.

One illustration of a specific organohydrogenpolysiloxane compound which can be employed in the practice of the present invention is 1,3,5,7-tetramethylcyclotetrasiloxane, which contains one silcon-bonded methyl group and one silicon-bonded hydrogen atom per silicon atom. Another illustrative material is a dimethylhydrogen chain-stopped dimethylpolysiloxane containing from 2 to 3 silicon atoms in the molecule. A further type of composition is one which comprises a copolymer of dimethylsiloxane units, methylhydrogensiloxane units, and trimethylsiloxane units and which contains from 2 to 5 or 10 or more silicon atoms per molecule. A still further useful type of compound is the compound containing three dimethylhydrogensiloxane units and one monomethylsiloxane unit per molecule. Another useful material is the low viscosity fluid composed of dimethylhydrogensiloxane units and $SiO_2$ units in the ratio of 2 moles of the former to one mole of the latter. In addition to containing silicon-bonded methyl groups as illustrated in the specific compounds mentioned above, these organohydrogenpolysiloxanes can also contain a variety of other organic groups, even though the preferred materials are those in which all of the R'' groups of formula (2) are methyl. No disadvantage is found in substituting a minor portion of the methyl groups with phenyl groups.

While the compositions of the present invention can be prepared by merely mixing the various components together in any desired fashion as previously described, it is often found most convenient to prepare these compositions in two separate portions or packages which are combined at the time the compositions are to be converted to the solid, cured, elastic state. In the case of the two-package formulation, it is convenient to include in the first package the vinyl chain-stopped polysiloxane component (1), the organopolysiloxane copolymer component (2) which has previously been dissolved in some or all of the vinyl chain-stopped polysiloxane, the platinum catalyst component (4) and some or all of the finely divided filler where a finely divided filler component (3) is employed. The second package contains as its sole essential ingredient the organohydrogenpolysiloxane component (5), but as a matter of convenience the second package can also contain a portion of the vinyl chain-stopped polysiloxane component (1) and a portion of any finely divided filler component (3) which is employed.

By adjusting the amount of vinyl chain-stopped polysiloxane fluid component (1) and filler component (3) in the second package, the relative proportions of the two packages required to produce the compositions of the present invention is controlled. Generally, the distribution of the components between the two packages is such that from 0.1 to 1 part by weight of the second package is employed per part of the first package. In selecting the components of the two packages, it is best not to include both the platinum catalyst component (4) and the organohydrogenpolysiloxane component (5) in the same package.

When the two-package system is employed, the two components are merely mixed in suitable fashion at the point of use and the mixture is maintained at the curing temperature until curing has been completed. Generally, complete cure can be obtained at times which vary from 24 hours at room temperature to 10 to 20 minutes at a temperature of about 100° C. The rate of cure is a function of both the concentration of platinum catalyst and the temperature of cure.

The details of curing the compositions of the present invention depend upon the particular application. Where the compositions are to be employed for encapsulating electronic components and the like, the component is placed in a suitable container, such as a polyethylene container, and the curable compositions of the present invention are poured into the container and the container is maintained at cure temperature for the desired time. After cure, the polyethylene container is stripped off, leaving an encapsulated electronic component. Where parts are to be fabricated of the curable compositions, the fabricated parts can be cast in the typical fashion in suitable molds of any type of plastic material. In addition, it is possible to strip the cured compositions of the present invention from aluminum molds. Where it is desired to form a fabricated part of the compositions of the present invention involving adhesion to metal, the metal surface is merely primed with any of the primers conventionally employed in the silicone art. When the composition cures in contact with a primed metal surface, an excellent bond is obtained. When the transparent compositions of the present invention are to be used as the interlayer in a safety glass laminate for vehicle windshields, the curable composition is merely poured into the space between parallel, spaced, transparent windshield members and allowed to cure at the appropriate temperature.

The following examples are illustrative of the practice of the present invention and are not intended for purposes of limitation. All parts are by weight.

Examples 1 through 13, which follow, describe different compositions containing dimethylvinyl chain-stopped organopolysiloxanes having different viscosities and varying proportions of the other components of the reaction mixture. In each case, all of the components of the reaction mixture were thoroughly mixed and then heated at a temperature of 100° C. for 30 minutes to cure the composition. In those cases in which a finely divided inorganic filler was employed, the compositions were an off-white. In those cases in which no finely divided inorganic filler or other coloring agents was employed, the compositions were cured, transparent silicone rubber. The vinyl chain-stopped diorganopolysiloxane employed in each example was a dimethylvinyl chain-stopped dimethylpolysiloxane and the variable in the composition was the viscosity. In each case, 100 parts of the divinyl chain-stopped polysiloxane component (1) was employed.

The copolymer component (2) was employed as a 50% xylene solution of a copolymer of trimethylsiloxane units, $SiO_2$ units and methylvinylsiloxane units. The various units were present in an amount sufficient to provide 0.8 trimethylsiloxane units per $SiO_2$ unit and with the methylvinylsiloxane units being present in an amount such that 7.0 mole percent of the silicon atoms were present as methylvinylsiloxane units and the remaining silicon atoms were present as a portion of a trimethyl siloxane unit or an $SiO_2$ unit. Component (1) and the solution of component (2) were premixed in the proportions required by the examples and the mixture was heated at 110° C. and 25 mm. for 4 hours to remove the xylene and form a solution of component (2) in component (1). The finely divided inorganic filler component (3) was a finely divided quartz having an average particle size less than about 5 microns. Component (4), the platinum catalyst, was one part chloroplatinic acid dissolved in one part n-butyl alcohol and was present in an amount sufficient to provide $10^{-5}$ gram atoms platinum per mole of silicon-bonded vinyl groups in the composition. The organohydrogenpolysiloxane component (5) was a 10 centistoke liquid copolymer of dimethylhydrogensiloxane units and $SiO_2$ units containing an average of two of the dimethylhydrogensiloxane units per $SiO_2$ unit. In Table I which follows is listed the viscosity of the vinyl chain-stopped dimethylpolysiloxane component (1), the parts of the copolymer component (2), the parts of the quartz filler component (3), the parts of the organohydrogenpolysiloxane component (5) (Si-H compound) and the tensile strength, Shore A hardness, percent elongation, and pounds per inch tear strength for each composition.

As shown in Table I, the compositions of Examples 5, 6, 8, 9, and 12 which are outside of the scope of the present invention are unacceptable in tear strength as compared with the remaining compositions of the table which are within the scope of the invention.

EXAMPLE 14

This example illustrates the preparation of the compositions of the present invention in two separate packages and the mixture of the packages to produce a curable composition and the subsequent curing of such compositions. The first package was prepared from 100 parts of a 100,000 centistoke dimethylvinyl chain-stopped dimethylpolysiloxane fluid, 30 parts of the copolymer described in connection with Example 1, a sufficient amount of the platinum alcoholate catalyst described in Example 1 of Patent 3,220,972—Lamoreaux, to provide $2 \times 10^{-5}$ parts platinum per part of silicon-bonded vinyl groups in the total composition, 65 parts of a finely divided quartz having a particle size averaging about 5 microns, and 3 parts of a cobalt-based pigment to impart a blue color to the composition. The second package comprised equal parts by weight of the 100,000 centistoke dimethylvinyl chain-stopped dimethylpolysiloxane fluid, the organohydrogenpolysiloxane described in connection with Example 1, and the finely divided quartz. A curable composition was prepared by mixing 10 parts of the first package with one part of the second package. One portion of the mixture was allowed to stand at room temperature and another was heated at a temperature of 100° C. for 20 minutes. After 24 hours at room temperature, the room temperature curing composition had a Shore A hardness of 53, a tensile strength of 715 p.s.i., an elongation of 450% and a tear of 75 pounds per inch. The same composition exhibited a Shore A hardness of 55 after 48 hours at room temperature, a tensile strength of 840 p.s.i., an elongation of 370%, and a tear of 90 pounds per inch. The sample heated 20 minutes at 100° C. had a Shore A hardness of 63, a tensile strength of 875 p.s.i., an elongation of 195%, and a tear of 110 pounds per inch.

EXAMPLE 15

Following the procedure of earlier examples, 25 parts of a resinous copolymer component (2) as a 50% solids solution in xylene was added to 100 parts of a diphenylvinyl chain-stopped copolymer of diphenylsiloxane units and dimethylsiloxane units which had a viscosity of 150,000 centistokes at 25° C. The reaction mixture was heated at a temperature of about 105° C. and 20 mm. for 4 hours to remove the xylene solvent and form a solution of the copolymer in the diphenylvinyl chain-stopped fluid. The resinous copolymer component (2) was a copolymer of vinyldimethylsiloxane units, methylvinylsiloxane units, dimethylsiloxane units, and $SiO_2$ units in ratios sufficient to provide 0.6 dimethylvinylsiloxane unit per $SiO_2$ unit and with approximately 4 mole percent of the siloxane

TABLE I

| Example No. | Component (1), Si-vinyl (viscosity, cs.) | Component (2), copolymer, parts | Component (3), Quartz parts | Component (5), Si-H parts | Hardness (Shore A) | Tensile, psi | Elongation, percent | Tear, p.p.i. |
|---|---|---|---|---|---|---|---|---|
| 1 | 550,000 | 33 | 67 | 7 | 60 | 1,100 | 350 | 114 |
| 2 | 110,000 | 33 | 67 | 7 | 60 | 850 | 240 | 107 |
| 3 | 80,000 | 33 | 67 | 7 | 60 | 780 | 230 | 93 |
| 4 | 55,000 | 33 | 67 | 7 | 55 | 600 | 330 | 72 |
| 5[1] | 27,000 | 33 | 67 | 7 | 44 | 780 | 200 | 54 |
| 6[1] | 3,500 | 33 | 67 | 7 | 70 | 1,100 | 100 | 38 |
| 7 | 110,000 | 20 | 60 | 6 | 46 | 710 | 200 | 64 |
| 8[1] | 110,000 | 10 | 55 | 5 | 40 | 700 | 300 | 31 |
| 9[1] | 95,000 | 0 | 50 | 4 | 30 | 580 | 310 | 25 |
| 10 | 550,000 | 33 | 0 | 7 | 45 | 830 | 640 | 80 |
| 11 | 80,000 | 33 | 0 | 7 | 50 | 800 | 310 | 64 |
| 12[1] | 3,300 | 33 | 0 | 7 | 55 | 1,000 | 110 | 22 |
| 13 | 90,000 | 33 | 130 | 7 | 80 | 1,090 | 90 | 95 |

[1] For comparative purposes.

units being methylvinylsiloxane units and 4 mole percent of the siloxane units being dimethylsiloxane units. The diphenylvinylsiloxane chain-stopped diorganopolysiloxane fluid component (1) contained an average of 3 diphenylsiloxane units per 100 dimethylsiloxane units. To one-half of the solution of component (2) in component (1) was added sufficient of the platinum-ethylene complex of Example 2 of the aforementioned Ashby Patent 3,159,601, to provide $10^{-5}$ gram atoms of platinum per mole of silicon-bonded vinyl groups in the composition and 5 parts of tris-(dimethylhydrogensiloxy)methylsilane. This mixture was poured out in a slab mold to a thickness of ¼ inch and heated to a temperature of 50° C. and maintained at such temperature for 3 hours. At the end of this time, the material cured to a hard, clear, transparent polysiloxane rubber having a tear strength in excess of 60 p.p.i. To the remaining portion of the solution of component (2) and component (1) was added the same amount of the platinum-ethylene complex and the methylhydrogenpolysiloxane, but in addition, 50 parts of finely divided carbon black was also added. This composition was also poured into a slab mold to a thickness of ¼ inch, heated at a temperature of 50° C. for 3 hours to produce a high tensile strength black silicone rubber having a tear strength in excess of 60 p.p.i.

While the foregoing examples have illustrated many of the embodiments of this invention, it is understood that this invention is directed broadly to curable compositions and the cured products thereof, which contain as essential ingredients the diorganovinyl chain-stopped diorganopolysiloxane having a viscosity of from about 50,000 to 750,000 centistokes at 25° C. and falling within the scope of formula (1), an organopolysiloxane copolymer comprising the monofunctional siloxane units, difunctional siloxane units and the $SiO_2$ units having the requisite amount of silicon-bonded vinyl groups, a platinum catalyst, an organohydrogenpolysiloxane of the type described, and having as an optional ingredient various fillers and other additives.

What I claim as new and desire to secure by Letters Patent of the United States is:

1. A curable composition having a tear strength of at least about 60 pounds per inch and comprising, by weight, (1) 100 parts of a liquid vinyl chain-stopped polysiloxane having the formula:

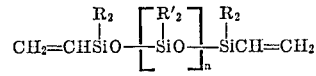

where R and R' are monovalent hydrocarbon radicals free of aliphatic unsaturation with at least 50 mole percent of the R' groups being methyl and where $n$ has a value sufficient to provide a fluid material having a viscosity of from about 50,000 to 750,000 centistokes at 25° C., (2) from 20 to 50 parts of an organopolysiloxane copolymer comprising trimethylsiloxane units, methylvinylsiloxane units, and $SiO_2$ units and where from about 2.5 to 10 mole percent of the silicon atoms contain silicon bonded vinyl groups and where the ratio of trimethylsiloxane units to the $SiO_2$ units is between 0.5:1 and 1:1, (3) from 0 to 200 parts of a finely divided inorganic filler which is non-reinforcing for silicone elastomers, (4) a platinum catalyst, (5) an amount of a liquid organohydrogenpolysiloxane having the formula:

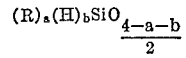

sufficient to provide from about 0.5 to 1.0 silicon-bonded hydrogen atoms per silicon-bonded vinyl group in the composition, where R is as previously defined, $a$ has a value of from 1.00 to 2.10, $b$ has a value of from about 0.1 to 1.0, and the sum of $a$ plus $b$ is from about 2.00 to 2.67, there being at least two silicon-bonded hydrogen atoms per molecule.

2. The cured product of claim 1.

References Cited

UNITED STATES PATENTS

| | | | |
|---|---|---|---|
| 3,284,406 | 11/1966 | Nelson | 260—825 |
| 3,341,490 | 9/1967 | Burdick et al. | 260—825 |

MORRIS LIEBMAN, *Primary Examiner.*

L. T. JACOBS, *Assistant Examiner.*

U.S. Cl. X.R.

260—825